United States Patent Office 3,441,370
Patented Apr. 29, 1969

3,441,370
METHOD OF REMOVING SULFUR COMPOUNDS FROM GASES
William R. Gutmann and James H. Wright, Louisville, Ky., assignors to Catalysts and Chemicals, Inc., Louisville, Ky., a corporation of Delaware
No Drawing. Filed Apr. 25, 1966, Ser. No. 544,836
Int. Cl. B01d 47/00
U.S. Cl. 23—2                                                                                           7 Claims

ABSTRACT OF THE DISCLOSURE

Method of removing sulfur compounds from gases containing steam wherein said gases at a temperature in excess of 300° F. are contacted with zinc oxide having a surface area in excess of 30 square meters per gram.

---

This invention, in one of the aspects, pertains to the removal of sulfur and sulfur compounds from industrial gas streams. In another aspect the invention pertains to removal of sulfur compounds from gases which are to be maintained at temperatures above those wherein activated carbon is effective for sulfur removal. In still another aspect the invention pertains to the removal of sulfur compounds from high temperature gas streams which contain steam.

It is customary in steam gas reforming and other chemical plants, for various reasons, to remove sulfur compounds from gas streams. These sulfur compounds may poison catalysts subsequently employed, or for some other reason, may be objectionable.

Various adsorbents and absorbents have been used in the desulfurization of feed and other industrial gas streams, for instance, such solutions as alkaline carbonate solutions, monoethanolamine, and sodium thioarsenate, as well as such packed columns as potassium phosphate, sodium hydroxide, iron oxide, zeolites and the like.

For the treatment of gas streams having low sulfur contents, zinc oxide has been found particularly effective, especially at high temperatures which eliminate the use of activated carbon. Zinc oxide will adsorb hydrogen sulfide very effectively at ambient temperatures and up to 800° F. Drums are usually operated at 500° to 800° F. At these temperatures RSH and COS are removed as well as $H_2S$. Some steam can be added to prevent carbon formation. However, as is known, the presence of steam reduces the effectiveness of the zinc oxide. Consequently it is not recommended for use when streams contain steam.

Several steam-gas reforming plants have successfully used zinc oxide to remove small amounts of sulfur from their feed gases. However, most reformed gas streams contain steam. In hydrogen production by steam-gas reforming the gases from the reforming stage are conveyed to a shift reactor. The water gas shift reaction involves the reaction between steam and carbon monoxide to produce hydrogen and carbon dioxide. Many plants are now using low temperature shift processes such as described in U.S. 3,303,001 filed Dec. 16, 1963. When this process is used it is preferred to remove any sulfur compounds ahead of the shift conversion to prevent shortening the life of the low temperature shift catalyst. In some instances a high temperature shift catalyst is used, followed by a low temperature shift catalyst. Frequently small quantities of hydrogen sulfide leave the high temperature shift converter, and if these are not removed they will act as a poison to the low temperature shift catalyst. The shift reaction temperature of about 450° F. eliminates the use of carbon as a sulfur removal means. In addition the exit gas from the high temperature shift reaction contains steam, usually in a steam-to-gas ratio of about 0.6. As stated hereinbefore, for this reason, zinc oxide is not sold for the purpose.

According to an aspect of this invention it has been found that at temperatures of 300° F., 400° F. and above there is a direct relationship between the surface area of zinc oxide and its affinity in a stream containing steam for sulfur compounds in said stream. In accordance with the invention the adsorption of sulfur compounds increases by a factor of at least six if zinc oxide having a surface area of at least 30 square meters per gram is employed instead of 5–9 square meters per gram most frequently employed in the adsorption of sulfur in the absence of steam. For the purpose, zinc having a surface area of 30 to 100, generally 30 to 60 square meters per gram will be used.

The advantages of using the particular zinc oxide in accordance with this invention can best be exemplified by reference to specific examples. First compare zinc oxides in sulfur removal systems where no steam is present.

Example 1

Gas mixture:
 Hydrogen sulfide _____ p.p.m.__ 300
 Nitrogen _____ percent__ 99.7
Process conditions:
 Temperature _____ ° F.___ 750
 Pressure _____ p.s.i.g.__ 100
 Space velocity (dry) _____ 3000

Under the above process conditions the hydrogen sulfide-containing gas stream was passed through a bed containing 3/16 in. pellets of a commercial zinc oxide. The surface area of this zinc oxide was 5 square meters per gram. When used in the removal of hydrogen sulfide from the gas stream shown above the capacity of the zinc oxide was 15 percent, based on the weight of the catalyst. In other words, the zinc oxide was able to adsorb 15 percent sulfur based on its own weight before becoming ineffective.

Example 2

Gas mixture:
 Hydrogen sulfide _____ p.p.m.___ 300
 Nitrogen _____ percent___ 90.7
Process conditions:
 Temperature _____ ° F.___ 750
 Pressure _____ p.s.i.g.___ 100
 Space velocity (dry) _____ 3000

Under the above process conditions the hydrogen sulfide-containing gas stream was passed through a bed containing 3/16 in. extrusions of a commercial a oxide. The The zinc oxide employed herein had a surface area of between 30 to 40 square meters per gram. When used in the removal of hydrogensulfide from the gas stream shown above the capacity of the zinc oxide was 18.2 percent based on the weight of the catalyst.

The preceding examples show that in removing hydrogen sulfide from a gas stream which contains no steam there is little difference in the capacity of high and low surface area zinc oxides for the hydrogen sulfide. The zinc oxide having a surface area of 5 was able to remove 15 percent based on its own weight before becoming ineffective. The zinc oxide having a surface area between 30 and 40 square meters per gram became ineffective after adsorbing about 18 percent based on its weight. The affinity of zinc oxides for sulfur compounds in dry gases thus does not vary with the surface area of the zinc oxide employed. It will be shown by the following examples, however, that when steam is present this is not the case.

Example 3

Gas mixture:

| | | |
|---|---|---|
| Carbon monoxide | percent | 3.5 |
| Carbon dioxide | do | 22.5 |
| Hydrogen | do | 55.0 |
| Nitrogen | do | 19.0 |
| Hydrogen sulfide | p.p.m. | 50 |

Process conditions:

| | | |
|---|---|---|
| Temperature | °F | 450 |
| Pressure | p.s.i.g. | 400 |
| Space velocity (wet) | | 20,000 |
| Steam/gas ratio | | 0.6 |

Under the above process conditions the gas stream, having a composition set forth in the table, was passed over commercial zinc oxide purchased as ¼ in. by ¼ in. tablets. This zinc oxide had a density of 100 to 110 pounds per cubic foot and its surface area was 9 square meters per gram. The capacity of this zinc oxide, based on the removal of sulfur from the gas stream until the catalyst was ineffective, was 1 percent, based on the weight of the catalyst.

Example 4

Gas mixture:

| | | |
|---|---|---|
| Carbon monoxide | percent | 3.5 |
| Carbon dioxide | do | 22.5 |
| Hydrogen | do | 55.0 |
| Nitrogen | do | 19.0 |
| Hydrogen sulfide | p.p.m. | 50 |

Process conditions:

| | | |
|---|---|---|
| Temperature | °F | 450 |
| Pressure | p.s.i.g. | 400 |
| Space velocity (wet) | | 20,000 |
| Steam/gas ratio | | 0.6 |

For use in this example zinc oxide was prepared by precipitation. The precipitation was accomplished by the addition of sodium carbonate to hydrated zinc nitrate. Solutions of the sodium carbonate and zinc nitrate were prepared, the zinc nitrate solution being added to the sodium carbonate solution. A temperature of 100° F. was maintained during precipitation. After precipitation the cake was allowed to settle. It was then reslurried with cold water and filtered. To convert the zinc carbonate to the oxide the zinc carbonate was calcined at 600° F. This zinc oxide had a density of 65 pounds per cubic foot and a surface area of 30 square meters per gram. Under the above process conditions the gas stream, having a composition set forth in the table, was passed over this 30 surface area zinc oxide, in the form of 3/16 in. extrusions. The capacity of this zinc oxide, based on the removal of sulfur from the gas stream until the catalyst was ineffective, was 6 percent based on the weight of the catalyst.

Example 5

Gas mixture:

| | | |
|---|---|---|
| Carbon monoxide | percent | 3.5 |
| Carbon dioxide | do | 22.5 |
| Hydrogen | do | 55.0 |
| Nitrogen | do | 19.0 |
| Hydrogen sulfide | p.p.m. | 50 |

Process conditions:

| | | |
|---|---|---|
| Temperature | °F | 450 |
| Pressure | p.s.i.g. | 400 |
| Space velocity (wet) | | 20,000 |
| Steam/gas ratio | | 0.6 |

At above process condition the gas mixture was passed over zinc oxide as ¼ in. by ¼ in. tablets prepared as in Example 4 but having a surface area of 5. This zinc oxide had a density of 110 pounds per cubic foot and a crush strength of 35. The capacity of this zinc oxide, based on the removal of sulfur from the gas stream until the catalyst was ineffective, was 0.95 percent, based on the weight of the catalyst.

Example 6

Gas mixture:

| | | |
|---|---|---|
| Carbon monoxide | percent | 3.5 |
| Carbon dioxide | do | 22.5 |
| Hydrogen | do | 55.0 |
| Nitrogen | do | 19.0 |

Process conditions:

| | | |
|---|---|---|
| Temperature | °F | 450 |
| Pressure | p.s.i.g. | 400 |
| Space velocity (wet) | | 20,000 |
| Steam/gas ratio | | 0.6 |

At process conditions hereinbefore listed the gas mixture was passed over zinc oxide as ¼ in. by ¼ in. tablets prepared as in Example 4 but having a surface area of 20. This zinc oxide had a density of 78 pounds per cubic foot and a crush strength of 20. The capacity of this zinc oxide, based on the removal of sulfur from the gas stream until the catalyst was ineffective, was 3.58 percent, based on the weight of the catalyst.

Example 7

Gas mixture:

| | | |
|---|---|---|
| Carbon monoxide | percent | 3.5 |
| Carbon dioxide | do | 22.5 |
| Hydrogen | do | 55.0 |
| Nitrogen | do | 19.0 |

Process conditions:

| | | |
|---|---|---|
| Temperature | °F | 450 |
| Pressure | p.s.i.g. | 400 |
| Space velocity (wet) | | 20,000 |
| Steam/gas ratio | | 0.6 |

At above process conditions the gas mixture was passed over zinc oxide as ¼ in. by ¼ in. tablets prepared as in Example 4 but having a surface area of 37. This zinc oxide had a density of 46 pounds per cubic foot and a crush strength of 8.6. The capacity of this zinc oxide, based on the removal of sulfur from the gas stream until the catalyst was ineffective, was 9.04 percent, based on the weight of the catalyst.

The foregoing examples show that when steam is present in the gas stream, the affinity of zinc oxide for sulfur compounds is drastically increased when higher surface area zinc oxides are employed. Thus by controlling the surface area of the zinc oxide, the capacity of this adsorbent for trace quantities of sulfur compounds is enhanced. Since the examples show the relationship of the surface area to the zinc oxide capacity, various modifications will be obvious to one skilled in the art. Thus hydrogen sulfide, present in natural gas, will be removed from steam-containing reforming gas streams by the process of this invention. However the process will be effective for removing mercaptans, disulfides, thiophenes, carbonyl sulfide and thioethers from light hydrocarbon streams. Normally the sulfur compound will be present in an amount of less than one percent. Such ramifications are deemed to be within the scope of this invention.

What is claimed is:

1. A process for removing from industrial gas streams any of mercaptans, disulfides, thiophenes, carbonyl sulfide, and thioethers wherein the stream is at a temperature above 300° F., wherein carbon is ineffective for removing sulfur compounds, and wherein the stream is in admixture with steam, which comprises passing said stream at said temperature through a bed of zinc oxide of controlled surface area and controlling the surface of said zinc oxide so that it is above 30 square meters per gram.

2. The process of claim 1 wherein the gas stream is a natural or refinery gas stream containing trace quantities of sulfur compounds wherein the temperature of the stream is above 300° F., and wherein the surface area is 30 to 100 square meters per gram.

3. The process of claim 1 wherein the stream is a carbon monoxide containing steam-gas reformer effluent, wherein the temperature of the stream is above 400° F. and wherein the surface area of the zinc oxide is 30 to 60 square meters per gram.

4. The process of claim 1 wherein the stream is a carbon monoxide containing effluent gas stream from a first stage of shift conversion, wherein the temperature of the stream is above 400° F., and wherein the surface area of the zinc oxide is 30 to 60 square meters per gram.

5. The process of claim 2 wherein the gas stream contains hydrogen sulfide.

6. The process of claim 2 wherein the gas stream contains a mercaptan.

7. The process of claim 2 wherein the gas stream contains carbonyl sulfide.

References Cited

UNITED STATES PATENTS 2,956,861   10/1960   Garlet _____ 23—147
3,284,158   11/1966   Johswich _____ 23—3 X OSCAR R. VERITZ, *Primary Examiner.*

E. C. THOMAS, *Assistant Examiner.*

U.S. Cl. X.R.

23—3, 210

U.S. DEPARTMENT OF COMMERCE
PATENT OFFICE
Washington, D.C. 20231

UNITED STATES PATENT OFFICE
CERTIFICATE OF CORRECTION

Patent No. 3,441,370                                                   April 29, 1969

William R. Gutmann et al.

It is certified that error appears in the above identified patent and that said Letters Patent are hereby corrected as shown below:

Column 2, line 44, "90.7" should read -- 99.7 --; line 53, cancel "a", second occurrence; same line 53, cancel "The"; line 56, "hydrogensulfide" should read -- hydrogen sulfide --; lines 57 and 58, "percent" should read -- percent, --. Column 3, line 64, cancel "Hydrogen sulfide------p.p.m.--50".

Signed and sealed this 14th day of April 1970.

(SEAL)
Attest:

Edward M. Fletcher, Jr.                               WILLIAM E. SCHUYLER, JR.
Attesting Officer                                                  Commissioner of Patents